US012140037B2

(12) United States Patent
Rohling et al.

(10) Patent No.: US 12,140,037 B2
(45) Date of Patent: Nov. 12, 2024

(54) GUIDE VANE ASSEMBLY OF A TURBOMACHINE AND METHOD FOR MOUNTING A GUIDE VANE ASSEMBLY

(71) Applicant: MTU Aero Engines AG, Munich (DE)

(72) Inventors: Markus Rohling, Munich (DE); Alexander Rauschmeier, Soechtenau (DE); Gerhard-Heinz Roesele, Aichach (DE)

(73) Assignee: MTU Aero Engines AG, Munich (DE)

(*) Notice: Subject to any disclaimer, the term of this patent is extended or adjusted under 35 U.S.C. 154(b) by 0 days.

(21) Appl. No.: 18/053,396

(22) Filed: Nov. 8, 2022

(65) Prior Publication Data

US 2023/0151773 A1 May 18, 2023

(30) Foreign Application Priority Data

Nov. 12, 2021 (DE) ......................... 102021129534.3

(51) Int. Cl.
*F01D 17/16* (2006.01)
*F01D 9/04* (2006.01)

(52) U.S. Cl.
CPC ........... *F01D 17/162* (2013.01); *F01D 9/042* (2013.01); *F05D 2220/32* (2013.01); *F05D 2230/60* (2013.01); *F05D 2240/12* (2013.01); *F05D 2260/30* (2013.01)

(58) Field of Classification Search
CPC ............................... F01D 17/162; F01D 9/042
See application file for complete search history.

(56) References Cited

U.S. PATENT DOCUMENTS 2,651,492 A * 9/1953 Feilden ................. F01D 17/162 415/137
2,862,654 A * 12/1958 Gardiner ............... F01D 17/162 415/161
2,950,084 A * 8/1960 Perry .................... F01D 17/162 415/180
3,182,453 A * 5/1965 Probert et al. ............ F02C 7/04 415/177
3,558,237 A * 1/1971 Wall, Jr. ................ F01D 17/162 415/149.4

(Continued)

FOREIGN PATENT DOCUMENTS

CN 101074613 A * 11/2007 ........... F01D 17/162
DE 69200303 T2 1/1995

(Continued)

*Primary Examiner* — Topaz L. Elliott
(74) *Attorney, Agent, or Firm* — Hinkley, Allen & Snyder, LLP; David R. Josephs

(57) ABSTRACT

The guide vane assembly as well as to a method for mounting a guide vane assembly of a turbomachine, including a number of adjustable guide vanes, provides a guide vane platform of which has a guide vane journal that is mounted in a receiving opening of a housing of the turbomachine, wherein a guide vane head of the guide vane has a bearing pin, which is mounted on an inner ring arranged on a rotor of the turbomachine. In the method, a guide vane journal, which is arranged on a guide vane platform of a guide vane, is brought into a receiving opening of a housing, which is arranged radially with respect to a rotor axis of the turbomachine, and an inner ring is provided on a rotor of the turbomachine.

15 Claims, 9 Drawing Sheets

(56) References Cited

U.S. PATENT DOCUMENTS

| | | | | | |
|---|---|---|---|---|---|
| 3,736,070 | A * | 5/1973 | Moskowitz | F01D 17/162 | 415/147 |
| 3,999,883 | A * | 12/1976 | Nordenson | F01D 17/162 | 415/113 |
| 4,135,362 | A * | 1/1979 | Glenn | F02C 6/08 | 415/115 |
| 4,187,054 | A * | 2/1980 | Landis, Jr. | F01D 5/18 | 415/115 |
| 4,214,851 | A * | 7/1980 | Tuley | F01D 25/14 | 415/115 |
| 4,214,852 | A * | 7/1980 | Tuley | F01D 5/18 | 415/115 |
| 4,498,790 | A | 2/1985 | Fisher | | |
| 4,834,613 | A * | 5/1989 | Hansen | F01D 17/162 | 415/189 |
| 4,861,228 | A * | 8/1989 | Todman | F01D 17/162 | 415/150 |
| 5,277,544 | A * | 1/1994 | Naudet | F04D 29/563 | 415/160 |
| 5,328,327 | A | 7/1994 | Naudet | | |
| 5,342,169 | A * | 8/1994 | Muller | F01D 17/162 | 415/912 |
| 5,517,817 | A * | 5/1996 | Hines | F01D 17/162 | 415/115 |
| 5,636,968 | A | 6/1997 | Audet | | |
| 6,210,106 | B1 | 4/2001 | Hawkins | | |
| 6,824,355 | B2 * | 11/2004 | Behrendt | F01D 17/162 | 415/160 |
| 6,843,638 | B2 * | 1/2005 | Hidalgo | F01D 17/162 | 415/189 |
| 7,717,670 | B2 | 5/2010 | Foucher | | |
| 10,746,057 | B2 * | 8/2020 | Snider | F01D 9/041 | |
| 2003/0049120 | A1 * | 3/2003 | Behrendt | F01D 17/162 | 415/151 |
| 2004/0109762 | A1 | 6/2004 | Hidalgo | | |
| 2005/0008477 | A1 | 1/2005 | Debeneix | | |
| 2008/0107520 | A1 * | 5/2008 | Battig | F01D 17/162 | 415/160 |
| 2010/0278651 | A1 * | 11/2010 | Jarusel | F04D 29/563 | 416/204 A |
| 2012/0093632 | A1 * | 4/2012 | Crespo | F01D 9/04 | 415/151 |
| 2016/0341068 | A1 | 11/2016 | Robertson, Jr. et al. | | |
| 2018/0058471 | A1 * | 3/2018 | Vyvey | F04D 29/563 | |
| 2020/0072086 | A1 * | 3/2020 | Snider | F01D 25/246 | |
| 2022/0145771 | A1 * | 5/2022 | Poick | F01D 17/162 | |

FOREIGN PATENT DOCUMENTS

| | | | | |
|---|---|---|---|---|
| DE | 102008005579 | A1 | 7/2008 | |
| EP | 1205639 | A1 * | 5/2002 | F01D 17/162 |
| EP | 1 760 272 | A2 | 3/2007 | |
| EP | 2 653 666 | A1 | 10/2013 | |
| EP | 3 354 862 | A1 | 8/2018 | |
| GB | 2204364 | B | 1/1991 | |
| WO | WO-2008119325 | A1 * | 10/2008 | F01D 11/001 |

* cited by examiner

GUIDE VANE ASSEMBLY OF A TURBOMACHINE AND METHOD FOR MOUNTING A GUIDE VANE ASSEMBLY

BACKGROUND OF THE INVENTION

The invention relates to a guide vane assembly of a turbomachine having a plurality of adjustable guide vanes, the guide vane platform of which has a guide vane journal, which is mounted in a receiving opening of a housing of the turbomachine, and a method for mounting a guide vane assembly.

A turbomachine comprises a compressor, a combustion chamber, and a turbine, which are arranged in series in the flow direction. Air enters the turbomachine and is placed under pressure in the compressor. The pressurized air is then mixed with fuel in the combustion chamber. Hot combustion gases are produced when the mixture of pressurized air and fuel undergoes subsequent combustion in the combustion chamber. The hot combustion gases flow downstream to the turbine, which takes energy from the combustion gases in order to drive the compressor.

Both the compressor and the turbine of a turbomachine usually comprise a plurality of stages, with each stage having a row of stationary guide vanes and a row of rotating blades. The stationary guide vanes thereby direct the gas flow in such a way that its incident flow at the rotating blades occurs at a predetermined angle. The guide vanes can be designed to be adjustable around their longitudinal axis in order to adapt the incident flow angle. Such guide vanes are typically mounted at their radially inner end on a stationary inner ring, as a result of which a spoke centering of the arrangement is produced. This creates a degree of freedom of the inner ring relative to the rotor of the turbomachine, thereby resulting in a requisite play between these components of the turbomachine. The radially outer ends of the adjustable guide vanes are thereby usually mounted rotatably around their longitudinal axis, which, in particular, is radially aligned, on the housing of the turbomachine. Because a plurality of components are typically installed on the inner ring in a narrow structural space, complicated inner-ring constructions are sometimes required and impair the stability and/or inherent rigidity of the inner ring and accordingly also a continuity of a sealing gap of the turbomachine.

SUMMARY OF THE INVENTION

An object of the present invention that is to provide an improved guide vane assembly of a turbomachine as well as an improved turbomachine. Furthermore, an improved method for mounting a guide vane assembly and for mounting a flow arrangement of a turbomachine is to be provided. This is accomplished in accordance with the invention by the teaching of the independent claims. Advantageous embodiments of the invention are the subject of the dependent claims.

Proposed for the achieving the object is a guide vane assembly of a turbomachine having a plurality of adjustable guide vanes. The guide vane platform of a guide vane has a guide vane journal, which is mounted in a receiving opening of a housing of the turbomachine, in particular in a receiving opening of a housing of the turbomachine arranged radially with respect to a rotor axis of the turbomachine. A guide vane head of the guide vane has a bearing pin, which is mounted on an inner ring arranged on a rotor of the turbomachine. A support device is arranged in a mounting space formed between the housing and the guide vane platform and supports the guide vane against the housing.

The support device results in a reduction in any relative movement and, in particular, results in a prevention of any relative movement of the guide vanes with respect to the housing, particularly in the longitudinal direction of the guide vane, and, in particular, of a plurality of guide vanes relative to one another. Accordingly, it is possible to reduce any load placed on the inner ring owing to a relative movement of the guide vane(s), as a result of which, on the one hand, a simplified structure of the inner ring is made possible and, on the other hand, the mounting of the guide vane assembly is facilitated by a simplified construction design of the inner ring.

A turbomachine has a housing (stator) through which an axial flow can occur and on which a plurality of guide vanes, in particular a plurality of guide vanes that are arranged adjacent to one another in the peripheral direction, are arranged radially with respect to an axis of rotation of the turbomachine, in particular in a spoke-centered manner. In this embodiment of the invention, the housing can also be designed, in particular, in a circumferential one-piece manner, as a result of which a more uniform thermal expansion of the housing and thus an improved gap behavior between the rotor and the stator is made possible.

Each guide vane can be mounted rotatably via a bush bearing in the receiving opening of the housing. For adjustment, the guide vane can be joined at an end of the guide vane journal, which, in particular, is arranged on the outer side of the housing, to an adjusting mechanism and, in particular, to an adjusting lever. By the adjusting mechanism, it is possible to pivot the guide vane, in particular by a predetermined angle, around its adjustment axis.

The guide vane, which, in particular, extends radially with respect to an axis of rotation of the turbomachine, has the guide vane head, which is mounted on the inner ring at its side facing the rotor of the turbomachine. To this end, the guide vane head comprises a bearing pin, which is received by a bearing seat that is arranged, in particular, on the peripheral side and is held rotatably in the bearing seat. The inner ring is set up to surround the rotor coaxially and is set up to join the guide vanes of the guide vane assembly to one another in order to stabilize the guide vane assembly and to bring about a suitable vibrational behavior of the guide vane assembly. Arranged on the inner ring is a sealing device, which serves to seal a sealing gap that is formed between the inner ring and the peripheral surfaces lying opposite arranged on the rotor. At its radial inner surface facing the rotor, the inner ring can thereby have, for example, a radially outer part of a labyrinth seal, which forms a labyrinth seal with a second inner part that is arranged on the opposite lying radial outer surface of the rotor.

The proposed solution is based on, among other things, the idea of supporting a guide vane at its housing-side end in such a way that the guide vane assembly can have a higher stability so as to make it easier to design the structure of the inner ring. To this end, it is proposed to utilize a mounting space, which, in particular, is formed during the mounting of the guide vane, for supporting the guide vane.

This mounting space is formed, in particular, essentially in the housing of the turbomachine and can be at least in part open or delimited by the guide vane platform. In this way, the guide vane platform can be arranged, in particular, essentially completely inside of the mounting space or at least partly protruding from it. The mounting space can thereby have at least one projection or wall that extends, in particular, along the radial inner side of the housing and/or is segmented in design and serves for arranging the guide vanes and/or for arranging or fastening the support device. The support device can therefore be designed to fill the mounting space essentially completely, in particular radially with respect to the turbomachine, at least in regions or in sections, in order to make possible the support of the guide vane. In particular, the support device is set up to engage around the guide vane journal, in particular axially, at least in part, in order to support the guide vane, in particular also in the axial direction of the guide vane journal. In this way, the guide vane is supported against the housing, in particular essentially in a play-free manner. The support device is thereby also set up, in particular, so as to rest at least in part against the housing radially with respect to the guide vane journal in order to make it possible to introduce a force in the radial direction of the guide vane pin via the support device in the housing.

In some embodiments, a bush bearing is arranged between the receiving opening formed in the housing and the guide vane journal and rotatably mounts the guide vane journal, in particular, around an axis of the guide vane journal, thereby making it possible to adjust the guide vane. In addition, a sliding bush bearing that also acts in the axial direction can be arranged between the guide vane platform and the support device and is set up to make possible a pivoting movement of the guide vane, in particular of the guide vane platform, with respect to the support device.

When the guide vane is mounted on the inner ring, the proposed guide vane assembly makes it possible to use a degree of freedom created by the mounting space on the housing, as a result of which the provision and accessibility of components of the guide vane assembly, in particular, is improved. It is hereby possible to structure the inner ring and to mount it in a simpler manner. Beyond this, the proposed guide vane assembly and the simplified mounting makes possible an embodiment of the housing and/or of the inner ring of the turbomachine as undivided components. Furthermore, owing to the fact that connected components for the housing and/or the inner ring are additionally dispensed with, it is possible to reduce the weight and to achieve a fundamentally more cost-effective construction of the turbomachine. Beyond this, the proposed structure, which provides for a support device in the mounting space or between the guide vane and the housing, with the support device being arranged, in particular, around an end of a guide vane journal that faces the guide vane platform, makes it possible to improve the vibrational resistance of the guide vane(s) and accordingly also that of the guide vane assembly.

In an embodiment of the guide vane assembly, the inner ring is one-piece or one-part in design or else segmented in design. A one-piece or one-part inner ring in the intendment of the disclosure is designed as a ring that engages completely around the rotor and can be pushed or is pushed axially around the rotor of the turbomachine. In particular, on the peripheral side, the inner ring has at least one bearing seat, which, in particular, is aligned radially with respect to the turbomachine and which is set up to receive a bearing pin of a guide vane.

In an embodiment of the guide vane assembly, the inner ring can also be designed as a half-ring. A half-ring in the intendment of the disclosure describes a semicircular arc and, in particular, is formed as a circular arc with an inner diameter and an outer diameter, which is coaxially arranged with respect thereto, and has a center angle of 180° over the inner diameter and/or outer diameter. In particular, the inner ring of the guide vane assembly is formed from two half-rings, which supplement each other to create a circumferential ring, which is set up to enclose the rotor completely in a coaxial manner. By way of such an embodiment of the inner ring, it is possible to increase the stability of the inner ring and/or of the guide vane assembly, as a result of which it is also possible to stabilize and accordingly improve a sealing of a circumferential sealing gap of the turbomachine.

In an embodiment of the guide vane assembly, the housing is designed, in particular circumferentially, in one-part. It is hereby possible to improve an airtightness of the housing and accordingly of the turbomachine. Furthermore, the additional material of flange surfaces results in a non-uniform thermal behavior over the circumference of the housing, thereby influencing the radial gaps between the rotor and the stator in a detrimental manner. Beyond this, a one-part housing has a simpler construction, so that it can also be produced in a cost-effective manner, in particular also because it is possible to dispense with fastening elements, such as nuts and bolts, that are required to join a plurality of housing parts.

In an embodiment of the guide vane assembly, the support device can be designed to center an adjustment axis of the guide vane in the receiving opening. To this end, the support device can be set up to provide, in addition to a support in the radial direction, also a support in the axial direction and/or in the circumferential direction of the turbomachine, in particular against the housing thereof. Owing to a centering of the guide vane, it is also possible to reduce any wear of a bush bearing in the receiving opening.

In an embodiment of the guide vane assembly, the support device has at least one first support element and at least one second support element. The support elements can hereby be designed and/or arranged in the mounting space in such a way that they form a support device or support the guide vanes against the housing. For example, the first support element and the second support element can be designed or interact in such a way that they, in particular jointly, surround the guide vane journal radially at least in part, in particular completely. The first support element and the second support element can hereby rest against each other. In particular, both support elements are designed so as to rest, also in the axial direction and/or in the peripheral direction, against the housing, in particular so as to rest inside of the mounting space against the housing in order to support the guide vanes. In particular, the support elements can be introduced individually and independently of one another in the mounting space or can move in it, as a result of which a mounting of the guide vane assembly is simplified still further.

In an embodiment of the guide vane assembly, the first support element is locked in position by the second support element. In particular, the first support element is locked in position or fixed in place by the second support element in such a way that, in particular during operation, it is arranged firmly in the mounting space. For example, a first support element can rest against a suitably aligned projection or a wall of the housing and can be held in position by a second support element. It is hereby possible for the mounting space to be delimited adjacently to the guide vane journal by the housing or a projection or wall of the housing and, in a further region adjacent to the guide vane journal, in particular in an oppositely lying region, to be designed to be open in order to be able to arrange one support element or a plurality of support elements during the mounting.

The support elements can correspond to one another or they can be designed analogously to one another in order to create a form-fitting connection. In particular, the support elements can each have contact surfaces that face one another and are designed to create a form fit between the two support elements. In an embodiment, it is also possible to dispense with an additional fixing in position, in particular of a first support element, as a result of which a mounting of the guide vane assembly is simplified.

In an embodiment of the guide vane assembly, the second support element can be locked in position by a fastening element, in particular a fastening element arranged on the housing. The fastening element can be designed and/or arranged in the housing in such a way that a form-fitting connection between the second support element and the fastening element exists. In particular, the fastening element can be formed by a liner element that is arranged on an inner circumference of the housing. The second support element can hereby be locked in position or fixed in place by the liner element, whereby the liner element can be inserted into a receiving device of the housing that is set up for this purpose. In this way, also a space-saving fastening of the second support element and accordingly, in particular, of the first support element or of the support device is possible.

In an embodiment of the guide vane assembly, the first support element can be designed as a hollow cylinder segment. In particular, the first support element can be designed as a hollow cylinder half or as a hollow cylinder segment having a center angle of 180° over the outer diameter and/or inner diameter of the hollow cylinder segment. An inner diameter of the hollow cylinder corresponds, in particular, essentially to a diameter of the guide vane journal, so that the first support element engages radially around the guide vane journal in part, in particular to an extent of one-half, and accordingly makes possible a fixed seating or a form-fitting support of the guide vane. The support element can hereby be put in place in the mounting space via, for example, a rotation around the guide vane journal.

In an embodiment of the guide vane assembly, the second support element can be set up to create, together with at least two first support elements, which are each assigned to a guide vane, a support device, in particular for the respective guide vane(s). The second support element can be set up to contact at least two and, in particular, a plurality of first support elements that are adjacent to one another in the peripheral direction or to rest against them and/or to lock them in position in order to form a support device. In particular, the mounting space of this embodiment can be designed along a radial inner circumference of the housing of the turbomachine. For example, it is also possible for a region of the mounting space that is set up to arrange the second support element in it to be designed along a radial inner circumference of the housing of the turbomachine. In this way, it is also possible to lock in position a plurality of first support elements or a large number of first support elements by a second support element, as a result of which a stability of the support device(s) and accordingly of the guide vane assembly can be improved.

In an embodiment of the guide vane assembly, the second support element can be designed as a ring segment, which has at least two adapter sections, and each adapter section is designed to interact with a first support element in order to form a support device. In particular, the second support element can be designed as a half-ring, so that two second support elements form with each other an essentially complete circular ring so as to be arrangeable or arranged in a circumferential mounting space, in particular a mounting space formed along a radial inner side of the housing, or a circumferentially formed region of the mounting space.

An adapter section is therefore, in particular, arranged on a front side of the ring segment and has a recess, in particular a radially aligned recess. The adapter section of the second support element is set up to interact with a first support element in order to form a support device. This recess, arranged in the adapter section of the second support element, can hereby have an essentially cylinder-shaped design in order to receive the guide vane journal at least in part or to engage around it. In addition, it is possible to provide on both sides of the recess a respective contact surface for the first support element, which, in particular, is set up to create a form fit with the first support element.

In an embodiment of the guide vane assembly, the support device has at least one third support element. In such an embodiment, the at least one third support element interacts, in particular, with at least one first support element and/or at least one second support element in order to form a support device for at least one guide vane. Thus, the first element and the second support element can be designed, for example, to be identical in construction, in particular to be mirror-symmetrical in design and, in particular, can be set up to engage around the guide vane journal. For example, the first support element and the second support element can be essentially square-shaped in design and can have a recess, which is set up to receive a guide vane journal. The first support element and the second support element can also be set up to hold the third support element in the mounting space. To this end, the third support element can form, in particular, a form-fitting connection with, for example, at least one first support element and/or at least one second support element.

In an embodiment of the guide vane assembly, the third support element is set up to be arranged between two guide vane platforms in order to support them. The third support element is hereby set up, for example, to create a form-fitting connection to at least one guide vane platform. For example, transverse to an adjustment axis of the guide vane, the guide vane platform has an essentially cylinder-shaped outer contour, which makes possible a pivoting around the adjustment axis. In such an embodiment, the third support element can be set up to interact in a form-fitting manner with the guide vane platforms of two adjacent guide vanes in order to support them against each other and to space them apart.

For example, the third support element can be designed so as to be arranged in the mounting space in such a way or at least essentially in such a way that it supports at least one guide vane platform against the housing. In particular, it can be arranged between two guide vane platforms in the mounting space or at least essentially in the mounting space in such a way that it supports two guide vane platforms, in particular two adjacent guide vane platforms, against each other and/or against the housing. The third support element can hereby have at least one fixing device, in particular a first fixing device. This fixing device engages, for example, in a fixing bearing in a form-fitting manner. Such a fixing bearing can be designed, in particular, as a groove, which, for example, is formed in at least one first support element, in particular in two first support elements. The third support element can also have a second fixing device, which likewise engages, in particular in a form-fitting manner, in a fixing bearing, which for example, is formed on at least one second support element or, in particular, on two second support elements.

In an embodiment of the guide vane assembly, the first support element and the second support element are each locked in position by a fastening element. A fastening element can hereby be designed, for example, as a screw bolt or otherwise fixable bolt. In an embodiment, the support elements can each be locked in position or fixed in place by a fastening element designed as a bolt. A bolt can hereby be inserted in an opening arranged in the housing, in particular transverse to the guide vane journal, and fix in place a support element on the guide vane journal and, in particular, can be clamped against the guide vane journal in order to support the guide vane against the housing. It can hereby be provided that the support elements can be shifted in each case by a fastening element from a mounting position to a holding position, in which the guide vane is supported by the support elements in the housing. In particular, it can hereby be provided that, in the housing or in the mounting space, a region is formed in which the support elements can be arranged or can be held ready and can be moved by fastening elements toward one another, in particular in the direction to the guide vane journal, in order to form a support device.

In an embodiment of the guide vane assembly, a plurality of guide vanes can be arranged radially, in particular circumferentially, on the housing and each guide vane can be supported by a support device against the housing.

In an embodiment, the support device is designed as a circular arc segment and has at least two receiving recesses, which are each set up to receive a guide vane journal at least in part.

The support device and/or the receiving recess(es) is/are set up to engage around the respective guide vane journal axially, in particular at least in part, in order to support the respective guide vane against the housing and thereby to make the guide vane assembly rigid. The support device can hereby be set up to be introduced in the mounting space and placed in position there (in the case of a mounting), in particular radially with respect to the guide vane journal and to rest there against the housing at least in part in order to make a support possible. Accordingly, by the support device, it is possible to support a plurality of guide vane journals, as a result of which a stability of the support device and accordingly of the guide vane assembly can be improved.

In an embodiment of the guide vane assembly, the support device can be designed as a half-ring, so that two support devices can together make possible a support, in particular a peripheral support, of the guide vane. A half-ring in the intendment of the disclosure describes a semicircular arc and, in particular, is designed as a circular arc with an inner diameter and an outer diameter, having a center angle of 180° over the inner diameter and/or the outer diameter. Accordingly, two support devices can form a circumferential ring so as to become arranged or to be arranged in a mounting space, in particular a circumferential mounting space. Accordingly, the number of components for the guide vane assembly can be reduced and a mounting time can thereby be diminished. The mounting space can hereby be delimited in a region radially with respect to the guide vane journal by the housing or the projection of the housing and, in a further region, the mounting space can be open radially with respect to the guide vane journal so as to be able to introduce the support device or support devices during a mounting.

In an embodiment, the receiving recess is essentially U-shaped and/or, in particular, is designed to be open in the axial direction. Accordingly, it is possible during the mounting to push on the support device, in particular in an axial direction, around or between the guide vane journals. A mounting of the support device in the mounting space can be simplified by such an embodiment, because the support device can be put in place in the mounting space all around the guide vane journal in one axial movement.

An end region of the receiving recess that bears the guide vane journal can hereby be designed in the shape of a hollow cylinder in order to engage radially around the guide vane journal, in particular to an extent of one-half. A width or an inner diameter of the U-shaped receiving recess can correspond essentially to the diameter of the guide vane journal, so that the support device or the receiving recess(es) thereof can engage radially around the respective guide vane journal and accordingly makes or make possible a permanent seating or a form-fitting support of the guide vane.

In some embodiments, the receiving recess can be designed to be non-axial, that is, for example, to be at an angle to a flange of the support device or bent, so that, during a mounting movement, an additional direction to the axial push can occur in order to hinder any detachment of the support device, in particular in the axial direction, of the support device.

In an embodiment, the support device has at least one spacer element, which is set up to be arranged all around the guide vane journal and/or all around the guide vane platform. The spacer element can hereby be set up to engage around the guide vane platform at least in part, in particular completely, and to support it against the housing and/or the support device. The guide vane platform has an essentially circular outer contour perpendicular to an adjustment axis of the guide vane in order to make possible a pivoting around the adjustment axis. Owing to the fact that the spacer element engages around the respective guide vane platform and, at the same time, can be positioned or supported against the housing and/or the support device, it is possible for forces to be absorbed by the guide vanes.

In an embodiment, the spacer element is set up to receive a sliding bush bearing or a thrust washer at least in part, in particular in order to fix it in place against the guide vane platform and/or to make possible an adjustment of the guide vane around the adjustment axis or the guide vane journal. Owing to the fastening of the thrust washer that is thus made possible, any wear can be reduced.

In an embodiment, the spacer element has an essentially rectangular cross-section. In particular, two adjacent spacer elements are set up so as to be supported against each other, in particular so as to be supported against each other in the peripheral direction of the turbomachine in order to thereby support two adjacent guide vane platforms against each other and/or to space them apart. The spacer element can hereby have an essentially rectangular or square cross-section in order to be able to be arranged in the mounting space between the support device, the housing, and the guide vane platform and in order to assist a mutual support of two spacer elements, in particular in the peripheral direction of the turbomachine, and, in particular, to cover or delimit the mounting space. For example, the spacer element can rest against a projection of the housing, which, in particular, is arranged radially with respect to the guide vane journal, and to be held in position by the support device and/or a fixing section of the support device and/or the guide vane platform.

In an embodiment of the guide vane assembly, it is possible to arrange a plurality of guide vanes radially, in particular circumferentially, on the housing and to support each guide vane by at least one support device. Each of the guide vanes can hereby be assigned a receiving recess and, in particular, a support element in order to support the plurality of guide vanes. By way of this embodiment, it is possible to create a simplified mountable guide vane assembly, which, at the same time, makes possible a stabile configuration of a sealing gap of the turbomachine.

Presented in accordance with a further aspect of the invention is a method for mounting a guide vane assembly of a turbomachine, including the following steps:

bringing a guide vane journal that is arranged on a guide vane platform of a guide vane into a receiving opening of the housing, which is arranged radially with respect to a rotor axis of the turbomachine;

providing an inner ring on a rotor of the turbomachine;

bringing the guide vane journal out of the receiving opening until a bearing pin arranged on a guide vane head of the guide vane engages a bearing seat arranged on the inner ring, whereby the guide vane platform, together with the housing, forms a mounting space;

arranging a support device in the mounting space, so that the guide vane is supported against the housing; and locking the support device in position.

Owing to the radial bringing of the guide vane into the receiving opening, the mounting of the guide vane assembly is simplified, the structural space in the turbomachine is better supported, and the structure of the inner ring can be simplified. Owing to the proposed method, it is also possible, moreover, to arrange the guide vane assembly in a housing that is designed to be one-piece in construction, as a result of which the turbomachine can be designed to be lighter and more cost-effective.

Because the guide vane assembly is arranged rotationally symmetrical with respect to the axis of rotation of the rotor, the mounting of the guide vane on the inner ring can occur radially all around the rotor. Furthermore, on account of the utilization of a housing-side mounting space for the support of the guide vane, the inner ring can be designed in a simpler manner. In a guide vane assembly according to the invention, it can be designed, for example, as a closed ring, in particular a one-piece ring, or, for example, it can be composed of two half-rings, as a result of which the number of components that are to be mounted can be reduced. In particular, the proposed method makes possible a reduction in the complexity of design of the inner ring and accordingly also a cost-effective production and mounting of the inner ring as well as further components of the turbomachine.

The support device can thereby be locked in position, for example, by a fastening element, in particular by a fastening element arranged on the housing, so that, in particular during operation, the support device is arranged firmly in the mounting space.

In an embodiment, during the arrangement of the support device, a first support element and subsequently a second support element are arranged in the mounting space in order to form a support device. It is hereby possible, in particular after the guide vane is brought out of the receiving opening and arranged on the inner ring (bearing pin engages in the bearing seat), to introduce a first support element in the mounting space and subsequently to lock it in position by a second support element.

In particular, it is hereby possible to assign a first support element to each of the guide vanes and to arrange them in the mounting space and, afterwards, to lock them in position by a second support element, whereby the second support element is set up to interact with a plurality of first support elements and to form a support device for a plurality of guide vanes. The second support element can hereby be designed as a ring segment or as a half-ring, which is set up to be accommodated essentially in the mounting space.

In an embodiment, the second support element is fastened by a fastening element, in particular by a liner element of the turbomachine, as a result of which, in particular, the first support element is also locked in position.

In another embodiment, prior to the insertion of the guide vane, a first support element and a second support element are arranged in the mounting space and, after bringing the guide vane out of the receiving opening (bearing pin engages in the bearing seat), a third support element is arranged in the mounting space. In this way, the first support element and the second support element can be held ready in at least one region of the mounting space so as, in a further step, to be brought into a final position, in which they support the guide vanes against the housing.

The housing can thereby have an opening of the mounting space, in particular an opening of the mounting space in front of the receiving opening, for insertion of the guide vane or of the guide vane platform, at which a region for holding ready the first support element and a region for holding ready the second support elements abut. These regions are, in particular, delimited by the housing. In these regions of the mounting space, it is possible in each case to arrange a support element in such a way that, in a further step, the support elements and thus the guide vane journals arranged between them are can move in order to engage around them in a final position, in particular at least in part, or in order to support them in a form-fitting manner against the housing.

Once the guide vanes are situated in their intended position, in particular provided that the bearing pin is arranged in the bearing seat on the inner ring, a third support element can be arranged in the mounting space between the guide vane platform and the housing. For this purpose, the third support element can be set up, for example, to create a form fit with at least one guide vane platform. In particular, the third support element is designed to be arranged in an opening of the mounting space arranged between the housing and a guide vane platform. The third support element is hereby designed, in particular, to close the mounting space together with the guide vane platform in a direction facing the rotor. The mounting space or one region or a plurality of regions of the mounting space can be designed along a radially inner side of the housing.

The third support element can be set up to be arranged between two adjacent guide vane platforms. The third support element can hereby be set up to create a form fit with two adjacent guide vane platforms and to space them apart and/or to support them against the housing.

Furthermore, the third support element can have a fixing device, which is set up to be arranged on at least one first support element and/or on at least one second support element and to be joined to at least one first support element, in particular two adjacent first support elements, and/or to be joined to at least one second support element, in particular two adjacent second support elements, in a form-fitting manner. For example, the third support element can have at least one fixing device, in particular a T-shaped fixing device, which is set up to be arranged on at least one support element or between two first and/or second support elements. The first support element and/or the second support element can hereby have at least one groove, which is set up to accommodate a partial region of a fixing device, in particular a T-shaped fixing device.

In an embodiment, the method comprises a further step of arranging a spacer element around the guide vane journal or the guide vane platform of the guide vane. It is hereby possible, first of all, to place a sliding bush bearing or a thrust washer in the spacer element or to arrange it around the guide vane journal, before the spacer element is arranged on the guide vane journal or the guide vane platform and the guide vane journal are inserted in the receiving opening of the housing. Accordingly, the spacer element can be held ready, in particular in a region of the mounting space, so as to be brought into a final position in a further step in order to support the guide vane(s) against one another or against the housing. The spacer element is hereby designed, in particular, to close off the mounting space, together with the guide vane platform, in a direction facing the rotor. The opening of the housing, which, in particular, forms an opening of the mounting space, and/or the mounting space can be designed circumferentially or continuously on the housing and, in particular, can be closed off circumferentially or continuously by the guide vane platform and the spacer element.

In an embodiment, the bringing of the guide vane journal into and out of a receiving opening occurs along an adjustment axis of the guide vane that is arranged radially with respect to a rotor axis of the turbomachine. The guide vane is hereby introduced into the structural space of the turbomachine and the adjustment axis of the guide vane is aligned with respect to the receiving opening formed in the housing. The guide vane journal is then brought into the receiving opening, in particular until the surface facing the guide vane journal abuts against the guide vane platform on the housing. The guide vane is hereby arranged in a radially outer position, so that, radially within the guide vane, sufficient structural space is available in order to provide an inner ring on the rotor. For example, when brought into or out of the receiving opening, the guide vane can be pivoted by an angle, in particular by about 90°, in order to be able, in particular, to move an airfoil of the guide vane, in particular temporarily, in the mounting space, as a result of which a structural space for providing the inner ring can be enlarged.

Once the inner ring is provided on the rotor and, in particular, is arranged in the intended position, the guide vane can be brought along the adjustment axis out of the receiving opening until the bearing pin of the guide vane engages in a bearing seat on the circumference of the inner ring and can be fastened to it. The adjustment axis is, in particular, a center axis of the guide vane journal and accordingly also the axis of rotation of the guide vane around which this guide vane of the guide vane airfoil can be pivoted in order to bring about a desired incident flow of air.

In an embodiment, the method comprises a further step of connecting the guide vane journal to an adjusting device. The adjusting device is set up, in particular, to adjust the guide vane around its adjustment axis by a predetermined angle in order to conduct a gas flow in such a way that it flows at a preferred angle against an arrangement of rotating blades. The adjusting device can hereby be connected by an adjusting lever to the guide vane journal. In particular, the adjusting device is designed in such a way that it interacts with a plurality of further adjusting devices, which are connected to a plurality of guide vanes or guide vane journals of a guide vane assembly.

Presented in accordance with a further aspect of the invention is a method for mounting a flow arrangement of a turbomachine, including the following steps:

- providing a housing;
- arranging a first rotating blade assembly in the housing;
- mounting a first guide vane assembly in the housing in accordance with one or more aspects of the previously described method; and
- arranging a second rotating blade assembly in the housing.

A flow arrangement of a turbomachine forms, in particular, a compressor device or a turbine device and usually has a plurality of stages. Each stage hereby comprises a stationary guide vane assembly and a rotating blade assembly, which extends out of a rotor hub. In particular in the proposed method, it is possible to provide a housing, in particular a one-part or multipart housing that is designed to be rotationally symmetrical around an axis of rotation of the turbomachine, in which a first rotating blade assembly is arranged. First of all, for example, a plurality of guide vanes are hereby arranged in the housing and, in particular, also on the housing in such a way that, in each case, a guide vane journal is brought into a receiving opening of the housing, in particular a receiving opening that is arranged radially with respect to the rotor axis of the turbomachine. An inner ring, in particular on the rotor, is then provided and the guide vane journal of the respective guide vane is brought out of the receiving opening in the direction of the axis of rotation of the turbomachine until a bearing pin arranged at a guide vane head of the respective guide vane engages in a bearing seat arranged on the inner ring. The guide vane platform now creates, together with the housing, a mounting space, in which, in the next step, a support device is arranged in such a way that it supports the guide vane(s) against the housing. In the next step, the support device can then be locked in position. In a further step, the guide vane journals of the respective guide vanes are connected to an adjusting device.

In a further step of the proposed method for mounting a flow arrangement, a second rotating blade assembly of the turbomachine, in particular a rotating blade assembly rotating with the rotor of the turbomachine is arranged in the housing. In optional further steps, it is possible alternatively to arrange further guide vane assemblies and rotating blade assemblies, in particular as described previously, in order to provide a flow arrangement with a predetermined number of stages.

In comparison to known methods, the described method for mounting a flow arrangement makes possible a simplified mounting, because a structural space in the housing can be better utilized owing to, in particular, radially bringing the guide vane(s) into and out of the receiving opening(s) and, at the same time, a simplified structure of an inner ring of the respective guide vane assembly and—in particular, depending on further structures of the turbomachine—a one-part design of the housing are made possible.

Presented in accordance with a further aspect is a turbomachine that has at least one guide vane assembly described herein or has a guide vane assembly or flow arrangement that is mounted in accordance with a method described herein. Such a turbomachine has the advantage that it can be designed and mounted in a simplified manner and, at the same time, can be produced in a cost-effective manner.

In general, the disclosure of the described guide vane assembly also applies to a corresponding method for mounting a guide vane assembly, a flow arrangement, or a corresponding turbomachine that comprises one guide vane assembly or a plurality of guide vane assemblies and vice versa. The features of the various exemplary aspects and exemplary embodiments described above and below can be combined unless stated explicitly otherwise.

BRIEF DESCRIPTION OF THE DRAWING FIGURES

Further features, advantages and possible applications of the invention ensue from the following description in association with the figures. Shown are:

DESCRIPTION OF THE INVENTION

Figure 1:
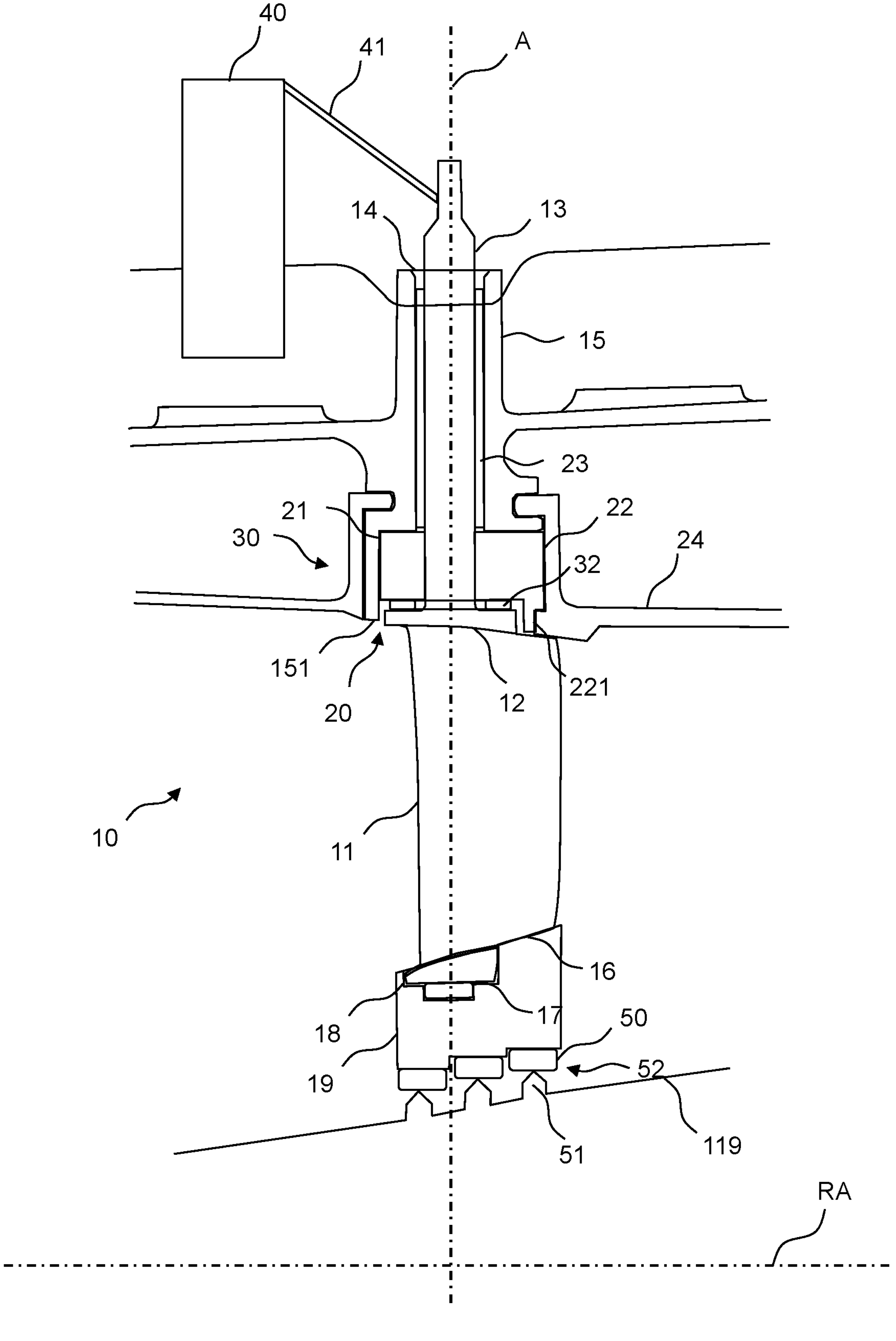
FIG. 1 is a schematic illustration of a first exemplary embodiment of a guide vane assembly of a turbomachine in accordance with the invention.

FIG. 1 shows a guide vane assembly 10 for a turbomachine having a plurality of adjustable guide vanes 11, the guide vane platform 12 of which has a guide vane journal 13, which is mounted in a receiving opening 14, which is arranged radially with respect to a rotor axis RA of the turbomachine, of a housing 15 of the turbomachine. An adjusting device 40 is connected by an adjusting lever 41 to the guide vane journal 13 in order to pivot the guide vane 11 around its adjustment axis A.

A guide vane head 16 of the guide vane 11 has a bearing pin 17, which is borne in a bearing seat 18 of an inner ring 19. In the exemplary embodiment illustrated, this inner ring 19 is designed to be undivided and extends in a plane perpendicular to the plane of the illustration around the rotor 119. On its radially inner surface facing the rotor 119 of the turbomachine, the inner ring 19 has a radially outer part 50 of a sealing device 52, which, together with a second radially inner part 51 arranged on the radial peripheral surface on the rotor 119, forms a sealing device 52.

Arranged between the guide vane platform 12 and the housing 15 is a mounting space 20, in which a first support element 21 and a second support element 22 are arranged and form a support device 30, by which the guide vane 11 is supported against the housing 15. The support elements 21, 22 are hereby set up to center the guide vane 11 around its adjustment axis A in a bush bearing 23 of the receiving opening 14. Arranged between the guide vane platform 12 and the support device 30 is a sliding bush bearing 32 in order to make possible an adjustment of the guide vane 11.

The mounting space 20 of the exemplary embodiment is delimited in the axial direction of the guide vane journal 13 by the housing 15 and radially with respect to the guide vane journal 13 by an inward-extending shoulder or projection 151 of the housing 15 that extends radially along a radial inner side of the housing 15. The first support element 21 is designed as as hollow cylinder segment, which is arranged radially around the guide vane journal 13. In the exemplary embodiment, the second support element 22 is designed as a half-ring, which extends in a plane perpendicular to the plane of the illustration around the rotor axis RA. A recess 26 (compare FIG. 2) is hereby designed on the front side of the support element 22 and is set up to surround the guide vane journal 13 at least in part. Adjacent to the recess 26, the second support element 22 has a shape that is designed to rest against the first support element 21 so as, together with it, thereby to surround the guide vane journal 13 at least in part or to form a support device 30.

Arranged on the housing 15 or pushed into it is a fastening element 24, which, in the exemplary embodiment, is designed as a liner element. By way of this fastening element 24, the second support element 22 is held in the mounting space 20 in such a way that it locks in position the first support element 21 in the mounting space 20. As further shown in FIG. 1, the second support element 22 has a mounting edge 221, which is provided to interact with the fastening element 24 in order to fix in place the support device 30 in the mounting space.

Figure 2:
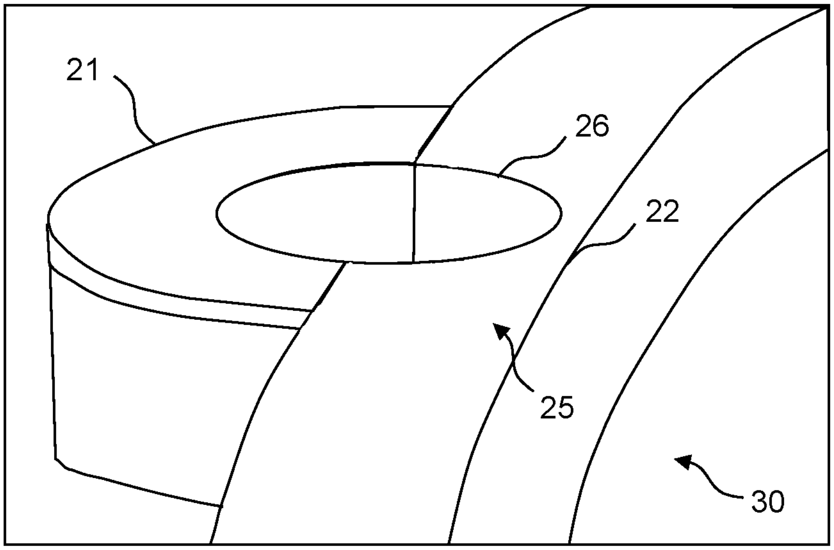
FIG. 2 is a schematic illustration of the support device of the first exemplary embodiment of the guide vane assembly from FIG. 1.

FIG. 2 shows a cutout of an exemplary support device 30 of the guide vane assembly 10 of a turbomachine from FIG. 1. The first support element 21 of the exemplary embodiment is a hollow cylinder half, for which the inner diameter of the hollow cylinder is designed to engage around the (not depicted) guide vane journal 13 of a guide vane 11 at least in part and, in the exemplary embodiment, to an extent of about one-half. The second support element 22 is designed as a half-ring, which is set up to be arranged circumferentially on the housing 15 or in the mounting space 20. Designed on the front side of the second support element 22 in an adapter section 25 is a recess 26, which is set up so as to engage, together with the first support element 21, around the guide vane journal 13 in order to support it.

On both sides of the recess 26, the second support element 22 is set up, in particular in the adapter section 25, to interact with the first support element 21 in order to lock it in position or support it. The second support element 22 is hereby set up with one adjacent first support element 21 or a plurality of first support elements 21, in particular in the peripheral direction, which each are assigned to a guide vane 11, in order to form a support device 30. Owing to this configuration of support elements 21, 22, a simplified mounting of the guide vane assembly 10 is made possible, because the support elements 21, 22 can be brought into the mounting space 20 in a simple manner and positioned there.

Figure 3:
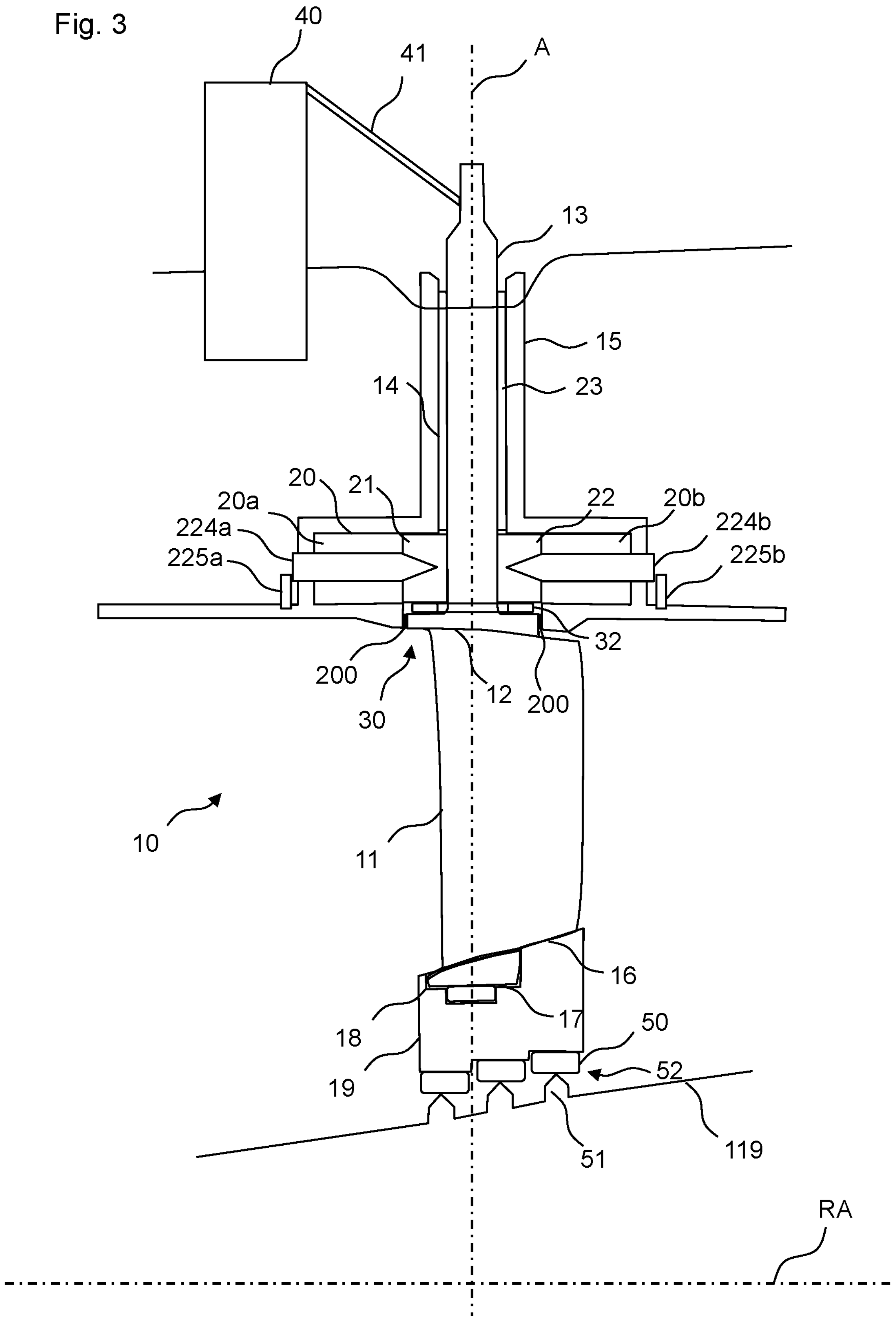
FIG. 3 is a schematic illustration of a second exemplary embodiment of a guide vane assembly of a turbomachine in accordance with the invention.

FIG. 3 shows a guide vane assembly 10 of a turbomachine having a plurality of adjustable guide vanes 11, the guide vane platform 12 of which has a guide vane journal 13, which is borne in a receiving opening 14, which is arranged radially with respect to a rotor axis of the turbomachine, of a housing 15 of the turbomachine. A guide vane head 16 of the guide vane 11 has a bearing pin 17, which is borne in a bearing seat 18 of an inner ring 19. In the exemplary embodiment, this inner ring 19 is formed from two half-rings, which are arranged coaxially with respect to the axis of rotation of the turbomachine and, in FIG. 3, extend in a plane perpendicular to the plane of the illustration. The inner ring 19 has, at its radial inner surface facing the rotor 119 of the turbomachine, a radially outer part 50 of a sealing device, which, together with a radially inner second part 51 arranged on the rotor 119, forms a sealing device 52.

Figure 4:
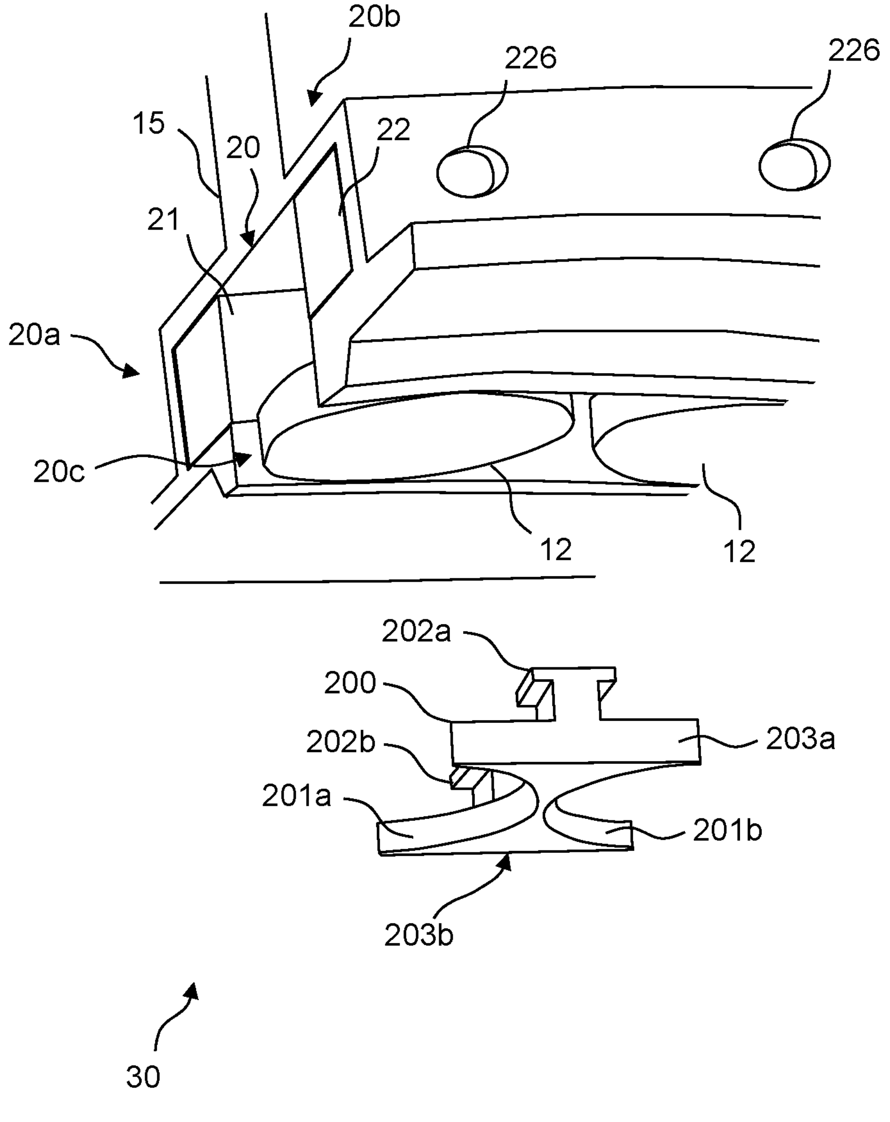
FIG. 4 is a schematic illustration of the support device of the second exemplary embodiment of the guide vane assembly from FIG. 3 in a step of an exemplary mounting method.

Arranged between the guide vane platform 12 and the housing 15 is a mounting space 20, in which a first support element 21, a second support element 22, and a third support element 200 are arranged. The mounting space 20 is delimited axially and radially with respect to the guide vane journal 13 by the housing 15. In a situation in which they are held ready, as illustrated in FIG. 4, the support elements 21, 22 are each arranged in second regions 20*a*, 20*b* of the mounting space 20 and are held ready in order to introduce the guide vane platform 12 between them in the mounting space 20. In this embodiment, the regions 20*a*, 20*b* are part of the mounting space 20.

The support elements 21, 22 are set up to engage around the guide vane journal 13 and to center the guide vane 11 around its adjustment axis A in a bush bearing 23 of the receiving opening 14. In the present exemplary embodiment, the support elements 21, 22 are each fixed in place in the housing 15 by a bolt 224*a*, 224*b*, whereby the bolts 224*a*, 224*b* are secured in the exemplary embodiment by a securing element 225*a*, 225*b* in each case.

Together with the third support element 200 (compare FIG. 4), the first support element 21 and the second support element 22 form a support device 30, by which the guide vane 11 is supported against the housing 15. Arranged between the guide vane platform 12 and the support device 30 is a sliding bush bearing 32 in order to make possible an adjustment of the guide vane 11.

FIG. 4 shows a cutout schematic illustration of an exemplary support device 30 of the exemplary embodiment of the guide vane assembly 10 from FIG. 3 during a mounting step of a method described herein for mounting a guide vane assembly 10. A first support element 21 is kept in a region 20*a* of the mounting space 20 and a second support element 22 is kept in a region 20*b* of the mounting space 20 so as, in a further step of a method described below in detail, to be pushed in the direction of the guide vane journal 13 in order to support the guide vane 11 against the housing 15. For this purpose, for example, the bolts 224*a*, 224*b* can be provided, by which the support elements 21, 22 can be pushed, in particular, through the fastening opening 226 in the housing 15 and locked in position.

Illustrated in FIG. 4 is a cutout of a guide vane assembly 10 in a step of a method described below in detail. A non-depicted guide vane head 16 is already arranged on a likewise non-depicted inner ring 19. Illustrated are two guide vane platforms 12, which are arranged in an opening 20*c* of the mounting space 20 that is formed by the housing 15.

A third support element 200 is illustrated below the housing 15 and is set up to be arranged in the mounting space 20 or in the opening 20*c* formed by the housing 15 between two adjacent guide vane platforms 12 (the airfoil of the guide vane 11 is not depicted). The mounting space 20 can be closed off by a third support element 200 and, at the same time, the guide vane platforms 12 can be supported against each other and against the housing 15.

In the illustrated exemplary embodiment, the third support element 200 has two oppositely lying flanks 203*a*, 203*b*, which are set up to rest against the housing 15, in particular in the opening 20*c*. Between the flanks 203*a*, 203*b*, the third support element 200 has oppositely lying receiving regions 201*a*, 201*b*, which are each set up to mount a guide vane platform 12 of two adjacent guide vanes 11 in such a way that they can pivot around the adjustment axis A thereof.

On a top side, which, in a mounting state, faces at least one first support element 21 and at least one second support element 22, the third support element 200 has two fixing devices 202*a*, 202*b*, which are set up to interact with at least one first support element 21 and at least one second support element 22 in order to lock in position the third support element 200 in the mounting space 20. In the illustrated exemplary embodiment, the fixing devices 202*a*, 202*b* are designed in such a way that they can each be arranged between two first support elements 21 and two second support elements 22. The support elements 21 and 22 hereby have lateral grooves, which are set up to create a form-fitting connection to the respective T-shaped fixing device 202*a*, 202*b*. For this purpose, the third support element 200 is arranged in the mounting space 20 in such a way that, when the support elements 21, 22 move toward each other in the direction of the guide vane journal 13, the grooves of the support elements 21, 22 engage in the fixing device 202*a*, 202*b*. In this way, a support device 30 that supports the guide vane(s) 11 against the housing 15 is formed.

A guide vane assembly 10 in accordance with the present disclosure can have a plurality of guide vanes 11, such as illustrated, for example, in FIG. 1 or FIG. 3, which are arranged in radial alignment on the housing 15, whereby each guide vane 11 is supported by a support device 30.

Figure 5:
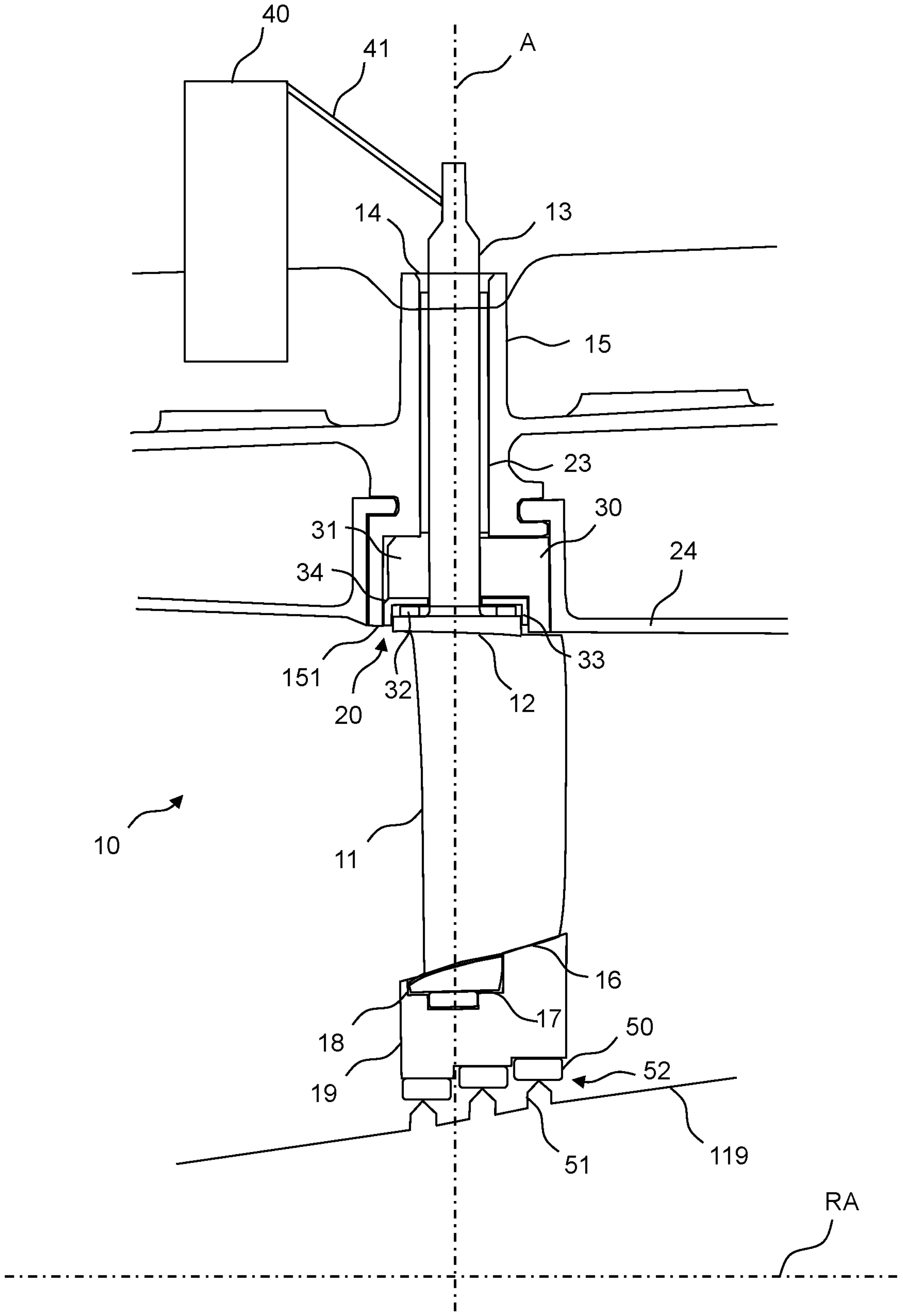
FIG. 5 is a schematic illustration of a third exemplary embodiment of a guide vane assembly of a turbomachine in accordance with the invention.

FIG. 5 shows a third exemplary embodiment of a guide vane assembly 10 for a turbomachine in a sectional illustration. The guide vane assembly 10 corresponds in terms of its structure essentially to the exemplary embodiments of FIG. 1 and FIG. 3 illustrated above, with the differences being presented below.

Arranged between the guide vane platform 12 and the housing 15 is a mounting space 20, which is delimited axially with respect to the guide vane journal 13 by the housing 15 and radially with respect to the guide vane journal 13 by a projection 151 of the housing 15. Illustrated in this circumferentially formed mounting space 20 is a support device 30, designed as a circular arc segment, by which the guide vanes 11 are supported against the housing 15. This support device has at least two receiving recesses 31, which are each set up to engage around a guide vane journal 13 at least in part in order to support the guide vane 11 against the housing 15. The support device 30, designed here as a half-ring, hereby extends in the peripheral direction in a plane perpendicular to the plane of the illustration. The receiving recess(es) 31, which are U-shaped in design, is/are formed on an axis-side flank of the support device 30 and are set up to engage around the guide vane journal(s) 13 at least in part. In the illustration, only one of the receiving recesses 31 of the support device 30 is depicted; the embodiments relating to the receiving recess 31 apply correspondingly to the at least one further receiving recess 31 of the support device 30.

The support device 30 or the receiving recess 31 as well as the guide vane journal 13 thereof and a spacer element 33 arranged around the guide vane journal 13 and the guide vane platform 12 are set up to accommodate the guide vane 11 and to center it around its adjustment axis A in a bush bearing 23 of the receiving opening 14. Arranged between the guide vane platform 12 and the spacer element 33 is a sliding bush bearing 32. In this case, the spacer element 33 is set up to accommodate the guide vane platform 12 and the sliding bush bearing 32 so as to fix them in place against each other and to make possible an adjustment of the guide vane 11. In the illustrated exemplary embodiment, the spacer element 33 has a rectangular cross-section and, on an edge, has an anti-pivot element 34 in the form of a chamfer, so that the mounting can be simplified and any accidental incorrect mounting can be prevented.

Arranged on the housing 15 or else inserted into it is a fastening element 24, in this case, a liner element, by which the support device 30 can be locked in position or fixed in place in the axial direction.

Figure 6:
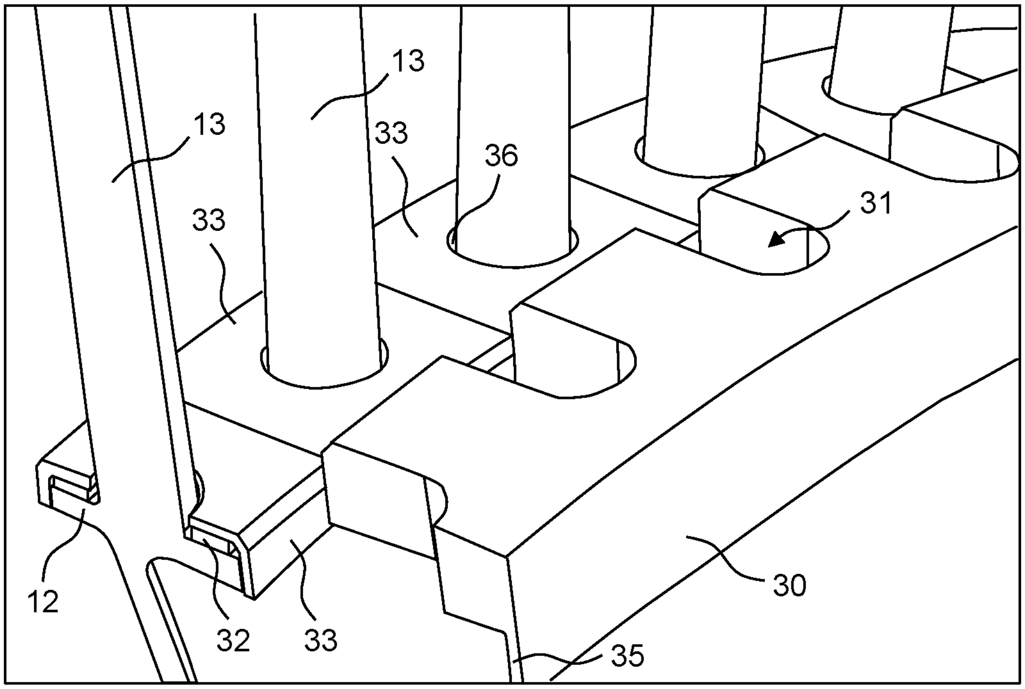
FIG. 6 is a schematic illustration of the support device of the third exemplary embodiment of the guide vane assembly from FIG. 5.

FIG. 6 shows a cutout of the guide vane assembly 10 of a turbomachine from FIG. 5 without the housing 15 in a partially exploded illustration. The support device 30, which is designed as a circular arc segment, has a plurality of receiving recesses 31, which can be arranged in an axial direction around the guide vane journal 13 and in the mounting space 20 or can be introduced between the guide vane journals 13 in order to stabilize the guide vane 11.

Arranged around the guide vane journal 13 of the guide vane 11 are spacer elements 33, which have a recess 36 and a square cross-section and which accommodate the guide vane journal 13 and, in particular, are centrally arranged. The spacer elements 33 are hereby each set up to accommodate a sliding bush bearing 32 and to position it with respect to the guide vane platform 12 and, at the same time, to mount the guide vane platform 12 in such a way that it can pivot in order to make possible an adjustment of the guide vane 11 around the adjustment axis A. Owing to the square cross-section, the spacer elements 33 can be arranged in the mounting space 20 and delimit it, whereby the spacer elements 33 are fixed in place, for example, by a fixing section 35 arranged on the support device 30, in particular in the axial direction of the turbomachine. Accordingly, the spacer elements 33 can, on the one hand, assist a support of the guide vane 11 against the housing 15 and, on the other hand, decrease any relative movement of the guide vane 11.

Figure 7:
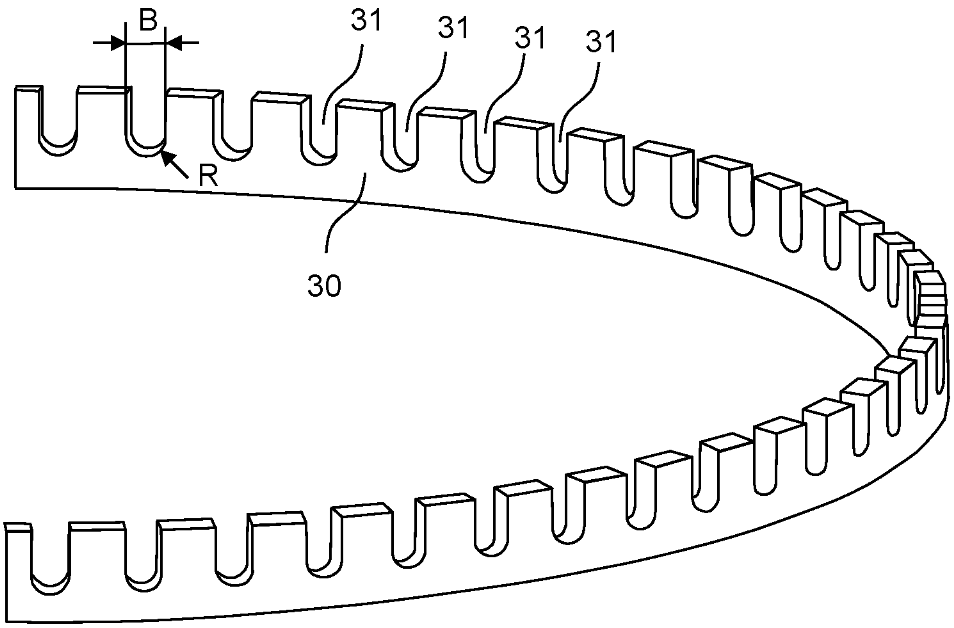
FIG. 7 is a schematic illustration of the exemplary support device of the third exemplary embodiment of the guide vane assembly from FIG. 5.

FIG. 7 shows an illustration of an exemplary support device 30 of the guide vane assembly 10 from FIG. 5 or FIG. 6. The support device 30 is designed as a semicircular segment or half-ring and has a plurality of U-shaped receiving recesses 31, which each are assigned to a guide vane journal 13 and are set up to accommodate it and accordingly to support it against the housing 15.

Owing to the embodiment as a half-ring, it is possible for a circumferentially formed mounting space 20 to be filled by two such half-ring-shaped support devices 30 in order to support the guide vanes 11. Owing to the fact that, in such an exemplary embodiment, only two support devices 30 are provided, it is possible to reduce the number of components that are to be mounted and, accordingly, to decrease a mounting time for the guide vane 11 or the inner ring 19.

A width B of the receiving recess 31 can essentially correspond to a diameter of the guide vane journal 13 and/or a radius R of an inner-lying hollow (half) cylinder formed in the receiving recess 31 can essentially correspond to a radius of the guide vane journal 13 in order to accommodate it, keep it ready, and support it. A depth T of the receiving recess 31 is, in particular, greater than a diameter of the guide vane journal 13, so that the support device 30 can protrude radially over the guide vane journal 13 in order to thereby improve a stabilization effect. The receiving recess 31 is formed openly at an axis-side flank of the support device 30 in order to be able to push it onto the guide vane journal 13 and thereby to support it.

Figure 8:
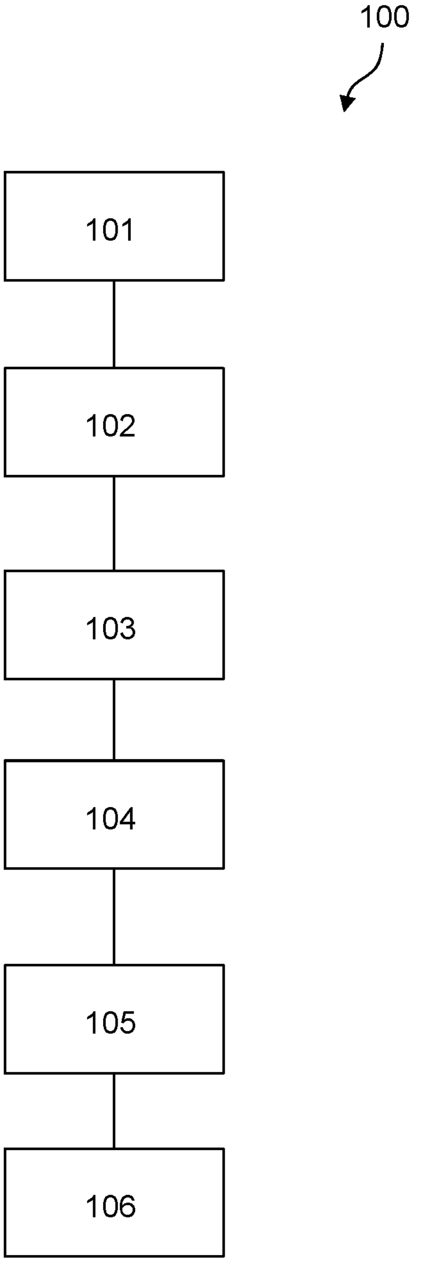
FIG. 8 is a schematic illustration of a flow chart of a first exemplary embodiment of a method according to the invention for mounting a guide vane assembly of a turbomachine.

FIG. 8 shows a flow chart of a first exemplary method 100 for mounting a guide vane assembly 10 of a turbomachine.

In a first step 101, a guide pin 13 arranged on a guide vane platform 12 of a guide vane 11 is introduced in a receiving opening 14 of a housing 15 radially with respect to a rotor axis of the turbomachine, in particular until the guide vane platform 12 abuts against the housing 15. In a further step 102, an inner ring 19 is provided on a rotor 119 of the turbomachine. In a further step 103, the guide vane journal 13 is brought out of the receiving opening 14 in the radial direction with respect to a rotor axis of the turbomachine until a bearing pin 17 arranged on a guide vane head 16 of the guide vane 11 engages in a bearing seat 18 arranged on the inner ring 19. The guide vane platform 12 thereby creates, together with the housing 15, a mounting space 20.

In a further step 104, a first support element 21 and a second support element 22 are arranged in the mounting space 20 in such a way that they form a support device 30. In a further step 105, the second support element 22 is fixed in place, in particular by a fastening element 24, as a result of which, in particular, the first support element 21 is also locked in position.

In a further step 106, the guide vane journal 13 is connected to an adjusting device 40, in particular by an adjusting lever 41, in order to be able to adjust the guide vane 11 around its adjustment axis.

Figure 9:
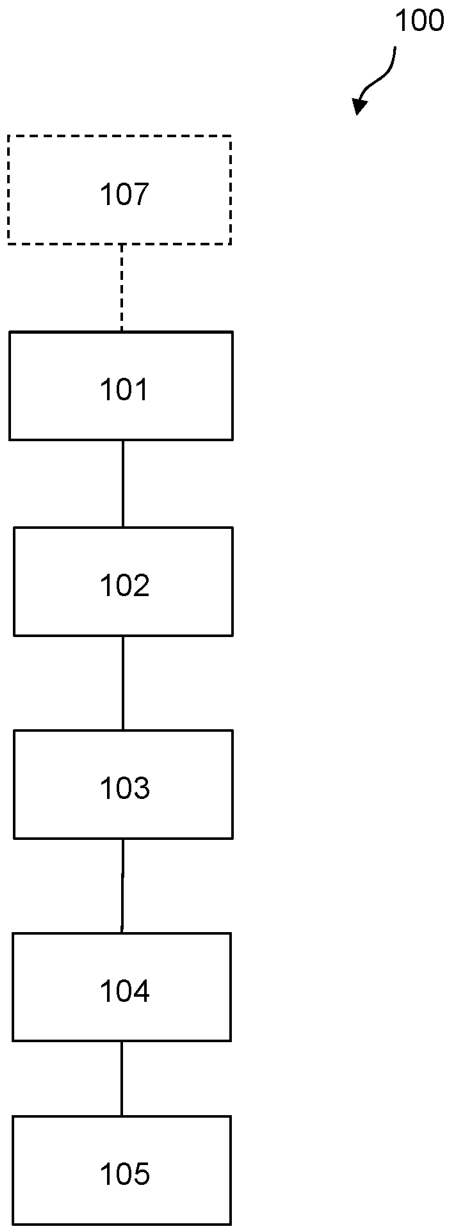
FIG. 9 is a schematic illustration of a flow chart of a second exemplary embodiment of a method according to the invention for mounting a guide vane assembly of a turbomachine.

FIG. 9 shows a flow chart of a second exemplary method 100 for mounting a guide vane assembly 10 of a turbomachine.

In a first step 101, a guide vane journal 13 arranged on a guide vane platform 12 of a guide vane 11 is introduced in a receiving opening 14 of a housing 15 arranged radially with respect to a rotor axis of the turbomachine, in particular until the guide vane platform 12 is in abutment with the housing 15. In an optional step 107, it is possible beforehand to arrange or provide a support element 32 around the guide vane journal 13 or the guide vane platform 12.

In a step 102, an inner ring 19 is provided on a rotor 119 of the turbomachine and, in a further step 103, the guide vane journal 13 is brought out of the receiving opening 14 radially with respect to a rotor axis of the turbomachine until a bearing pin 17 arranged on a guide vane head 16 of the guide vane 11 engages in a bearing seat 18 arranged on the inner ring 19, whereby the guide vane platform 12, together with the housing 15, creates a mounting space 20.

In a step 104, a support device 30 is arranged in the mounting space 20 in order to support the guide vane 11 against the housing 15. In a further step, the guide vane journal 13 is connected to an adjusting device 40, in particular by an adjusting lever 41, in order to be able to adjust the guide vane 11 around its adjustment axis A. In a further step 105, the support device 30 is fixed in place or locked in position, in particular by a fastening element 24.

Figure 10A:
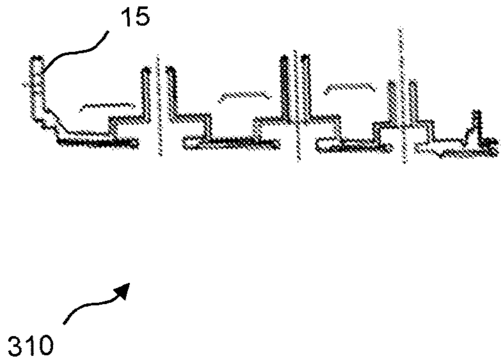
FIG. 10*a* to FIG. 10*f* are schematic illustrations of an exemplary embodiment of a method according to the invention for mounting a flow arrangement of a turbomachine.
Figure 10B:
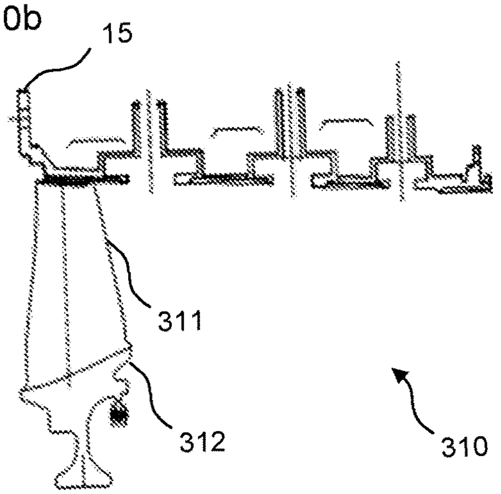
Figure 10C:
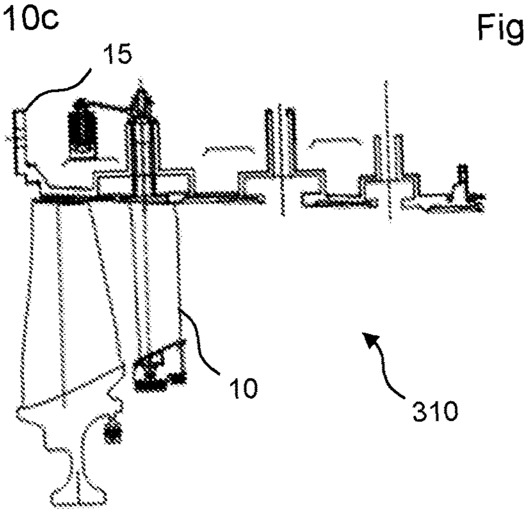
Figure 10D:
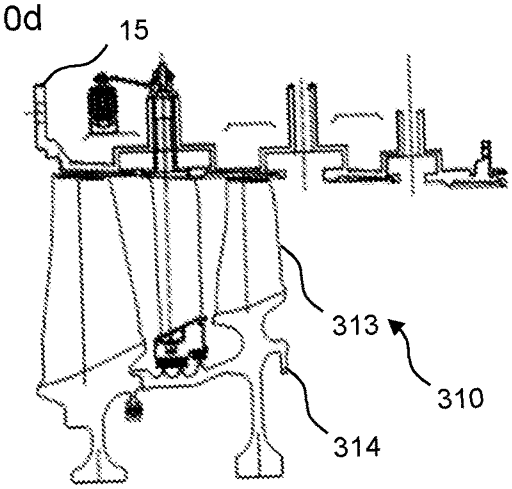
Figure 10E:
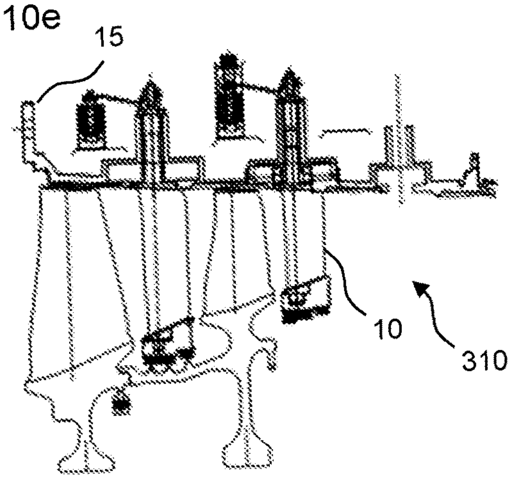
Figure 10F:
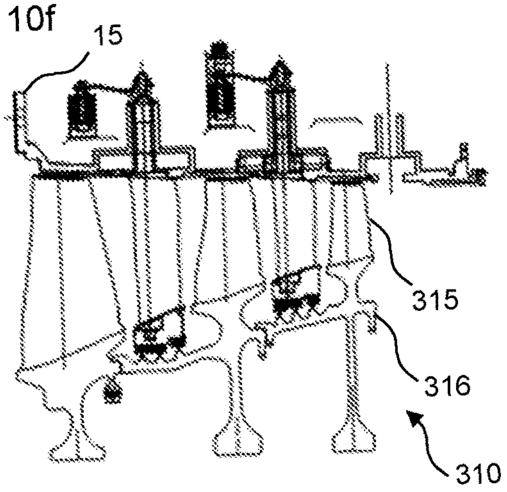

FIG. 10*a* to FIG. 10*f* show a schematic illustration of steps of an exemplary embodiment of a method 300 for mounting a flow arrangement 310 of a turbomachine. FIG. 10*a* shows a step of providing a housing 15. FIG. 10*b* shows the arrangement of a first rotating blade assembly 311, which has a first rotor section 312, in the housing 15. FIG. 10*c* shows the mounting of a first guide vane assembly 10 in the housing 15 in accordance with the method 100 described herein. A divided or undivided inner ring 19 is hereby introduced into the structural space that is available in the turbomachine, after which the guide vane 11 of the guide vane assembly 10 can be arranged on it. Because, in the proposed method in comparison to known methods, a mounting of a plurality of inner-ring components can be dispensed with, the mounting of the flow arrangement 310 is simplified FIG. 10*d* shows the arrangement of a second rotating blade assembly 313, which has a second rotor section 314, in the housing 15 and FIG. 10*e* shows the mounting of a second guide vane assembly 10 in the housing 15 in accordance with the proposed method 100. FIG. 10*f* shows the arrangement of a third rotating blade assembly 315, which has a second rotor section 316, in the housing 15.

What is claimed is:

1. A guide vane assembly of a turbomachine, comprising:

a plurality of adjustable guide vanes, a guide vane platform of each of which has a guide vane journal mounted in a receiving opening of a housing of the turbomachine, each of the plurality of adjustable guide vanes having an adjustment axis, wherein a guide vane head of each guide vane has a bearing pin, which is mounted on an inner ring arranged on a rotor of the turbomachine, and wherein a mounting space is arranged between the housing and each guide vane platform, in which a support device is arranged, which supports each respective guide vane against the housing, wherein the support device is located entirely radially inward of the housing in a direction of the adjustment axis and between the guide platform and the housing, the support device receives and is arranged around each guide vane journal in an axial direction of the turbomachine via respective receiving recesses in the support device; the receiving recesses in the support device being U-shaped.

2. The guide vane assembly according to claim 1, wherein the inner ring is configured as one-piece, segmented, or a half-ring.

3. The guide vane assembly according to claim 1, wherein the support device is configured and arranged to center the adjustment axis of each guide vane in the receiving opening.

4. The guide vane assembly according to claim 1, wherein the support device is configured and arranged as a circular arc segment and has at least two receiving recesses, which are each configured and arranged to accommodate one of the guide vane journals, at least in part.

5. The guide vane assembly according to claim 4, wherein the support device is configured and arranged as a half-ring.

6. The guide vane assembly according to claim 1, wherein the support device has at least one spacer element, which is arranged all around one of the guide vane journals.

7. The guide vane assembly according to claim 6, wherein the at least one spacer element is configured and arranged to accommodate a sliding bush bearing, at least in part.

8. The guide vane assembly according to claim 6, wherein the at least one spacer element is substantially rectangular in cross-section.

9. A method for mounting a guide vane assembly of a turbomachine, comprising the steps of:

bringing a guide vane journal, which is arranged on a guide vane platform of a guide vane, into a receiving opening of a housing, which is arranged radially with respect to a rotor axis of the turbomachine; the guide vane journal having an adjustment axis;

providing an inner ring on a rotor of the turbomachine;

bringing the guide vane journal out of the receiving opening until a bearing pin arranged on a guide vane head of each guide vane engages in a bearing seat arranged on the inner ring, wherein the guide vane platform, together with the housing, creates a mounting space;

arranging a support device in the mounting space, so that each guide vane is supported against the housing;

positioning the support device entirely radially inward of the housing in a direction of the adjustment axis and between the guide platform and the housing; the support device being received and arranged around each guide vane journal in an axial direction of the turbomachine via respective receiving recesses in the support device; the receiving recesses in the support device being U-shaped; and locking in position the support device.

10. The method according to claim 9, further comprising the step of:

arranging a spacer element around the guide vane platform.

11. The method according to claim 9, wherein bringing the guide vane journal into and out of receiving opening occurs along an adjustment axis of each guide vane that is arranged radially with respect to a rotor axis of the turbomachine.

12. The method according to claim 9, further comprising the step of:

connecting the guide vane journal to an adjusting device.

13. A method for mounting a flow arrangement of a turbomachine, comprising the steps of:

providing a housing;

arranging a first rotating blade assembly in the housing;

mounting a first guide vane assembly in accordance with a method according to claim 9 in the housing; and arranging a second rotating blade assembly in the housing.

14. A method for mounting a flow arrangement of a turbomachine in accordance with claim 13, wherein the first guide vane assembly comprises:

a plurality of adjustable guide vanes, the guide vane platform of which has a guide vane journal mounted in a receiving opening of a housing of the turbomachine, wherein a guide vane head of each guide vane has a bearing pin, which is mounted on an inner ring arranged on a rotor of the turbomachine, and wherein a mounting space is arranged between the housing and the guide vane platform, in which a support device is arranged, which supports each guide vane against the housing.

15. A turbomachine, comprising:

at least one guide vane assembly including:

a plurality of adjustable guide vanes, a guide vane platform of each of which has a guide vane journal mounted in a receiving opening of a housing of the turbomachine, the guide vane journal having an adjustment axis;

wherein a guide vane head of each guide vane has a bearing pin, which is mounted on an inner ring arranged on a rotor of the turbomachine, and wherein a mounting space is arranged between the housing and each guide vane platform, in which a support device is arranged, which supports each guide vane against the housing;

and at least one guide vane assembly that is mounted in accordance with the steps of:

bringing a guide vane journal, which is arranged on a guide vane platform of a guide vane, into a receiving opening of a housing, which is arranged radially with respect to a rotor axis of the turbomachine;

providing an inner ring on a rotor of the turbomachine;

bringing the guide vane journal out of the receiving opening until a bearing pin arranged on a guide vane head of each guide vane engages in a bearing seat arranged on the inner ring, wherein the guide vane platform, together with the housing, creates a mounting space;

arranging a support device in the mounting space, so that each guide vane is supported against the housing; wherein the support device is located entirely radially inward of the housing in a direction of the adjustment axis and between the guide platform and the housing, the support device receives and is arranged around each guide vane journal in an axial direction of the turbomachine via respective receiving recesses in the support device; the receiving recesses in the support device being U-shaped; and locking in position the support device;

and a flow arrangement that is mounted in accordance with the steps of:

providing a housing;

arranging a first rotating blade assembly in the housing;

mounting a first guide vane assembly in the housing in accordance with the steps of mounting at least one guide vane assembly; and arranging a second rotating blade assembly in the housing.

* * * * *